United States Patent [19]  [11] Patent Number: 5,459,510
Hamalainen  [45] Date of Patent: Oct. 17, 1995

[54] CCD IMAGER WITH MODIFIED SCANNING CIRCUITRY FOR INCREASING VERTICAL FIELD/FRAME TRANSFER TIME

[75] Inventor: Kaarlo J. Hamalainen, Medford, N.J.

[73] Assignee: Panasonic Technologies, Inc., Secaucus, N.J.

[21] Appl. No.: 272,040

[22] Filed: Jul. 8, 1994

[51] Int. Cl.6 .................................................. H04N 5/335
[52] U.S. Cl. ........................................ 348/322; 348/317
[58] Field of Search ................................. 348/241, 248,
 348/249, 250, 294, 295, 297, 298, 317,
 312, 320, 321, 322, 207, 317, 311; H04N 5/335

[56] References Cited

U.S. PATENT DOCUMENTS

| 4,521,804 | 6/1985 | Bendell | 352/24 |
| 4,521,804 | 6/1985 | Bendell | 348/340 |
| 5,144,445 | 9/1992 | Higashitsutsumi | 348/294 |
| 5,264,939 | 11/1993 | Chang | 348/222 |
| 5,287,192 | 2/1994 | Iizuka | 348/294 |

OTHER PUBLICATIONS

Carlos H. Sequin, "Charge Transfer Device", pp. 143–200 (1975).
K. Itakura, et al., "TP 12.3 A Multiple Frame-Interline-Transfer (M-FIT) CCD—A New Concept for Progressive Scan Camera Systems—", *IEEE International Solid State Circuits Conference,*" (Feb. 1993).
T. Nakamura et al., "Studio CCD Camera Technology", *International Broadcast Conference*, Publication No. 327, (Sep. 21–Sep. 25, 1990).
M. Sugawara, et al., "TP 13.6: An Amplified MOS Imager Suited for Image Processing", *IEEE International Solid-State Circuits Conference*, (1994).
N. Murata, et al., "A TV Camera Based on a Single Digital Signal Processing LSI Device", *18th International Television Symposium and Exhibition*, pp. 136–154 (Jun. 10–15, 1993).
T. Asaida, et al., "Digital Signal Processing Technology for Broadcast TV Cameras", *Sony Business and Professional Group*, pp. 442–447 (Jul. 1992).
T. Leacock, "HDTV Digital Camera Processor", *Society of Motion Picture and Television Engineers*, 135yh SMPTE Technical Conference, pp. 1–15 (Oct. 29–Nov. 2, 1993).

Primary Examiner—Joseph Mancuso
Assistant Examiner—Tuan V. Ho
Attorney, Agent, or Firm—Ratner & Prestia

[57] ABSTRACT

A CCD imager is used in a television camera which generates signals for use with a particular television standard, such as the proposed U.S. HDTV production standard. The imager includes a light-sensitive A register which generates signal in the form of charge during an integrating interval, a B charge storage register into which the charge is transferred during a pull-down interval, and a horizontal shift register coupled to the last row of the B register, into which the charges are simultaneously coupled, and serially read. The video signals produced by the imager are subject to distortion caused by incomplete charge transfer in the pull-down interval and crosstalk noise resulting from gating the clock signals to the horizontal shift register on and off. Vertical transfer distortion is reduced by reading the horizontal lines from the horizontal shift register with reduced intervals between the active portions, which allows the pull-down interval to be increased. The increased pull-down interval allows use of a lower frequency signal for the vertical transfer clock signal. Crosstalk noise is reduced by applying the horizontal shift register clock to the horizontal shift register continuously.

7 Claims, 4 Drawing Sheets

CCD IMAGER WITH MODIFIED SCANNING CIRCUITRY FOR INCREASING VERTICAL FIELD/FRAME TRANSFER TIME

FIELD OF THE INVENTION

This invention relates to television or video cameras which generate video signals for a system operating according to certain well defined scanning standards, and more particularly to television cameras using charge-coupled device (CCD) imagers, in which the scanning of the imagers is modified for enhanced performance.

BACKGROUND OF THE INVENTION

The conventional NTSC color television system used in the United States is notoriously well known. This system was established at a time when the implementation of electronic functions required vacuum tubes, and complex electronic functions could not be implemented in commercial equipment because of cost and reliability considerations. Thus, the NTSC standards were selected in consideration, among other considerations, of simplicity, and of accommodation of the idiosyncrasies of the electronic components available at that time.

Due to the deficiencies of early color cameras, transmitters and receivers, color hues were often incorrectly reproduced, and other image distortions were common. When European nations adopted color television standards, they attempted to alleviate some of the perceived problems by adopting a phase alternate line scheme (PAL), and by making other modifications such as increasing the number of displayed lines of video and/or accommodating different power-line frequencies by amending the timing standard. As a result of these differences, color television receivers for the various well-known television systems are incompatible with transmitters broadcasting other standards.

In the time since inception of the current television standards, electronic components have been significantly improved. For example, reliable transistors supplanted vacuum tubes, and integrated circuits have been developed that allow inexpensive receivers to perform complex processing functions.

Television cameras have also been improved, with various reliable, sensitive, low-voltage solid-state imagers such as charge-coupled device (CCD) imagers supplanting the earlier vacuum-tube imagers, with their high voltage requirements, magnetic windings, and alignment problems. The text *Charge Transfer Devices,* by Séquin et al., published by Academic Press, 1975, describes the general characteristics of charge transfer devices and charge coupled device (CCD) imagers. The CCD imagers have an image sensing portion including an array of light sensitive pixels arrayed in rows and columns for building up charge during an integrating interval, an image storage portion into which the charge from the sensor portion is rapidly transferred during the vertical blanking (VB) interval, and a horizontal transfer portion which reads the image from the storage portion line by line.

While the vacuum-tube imagers in cameras are being supplanted by solid-state devices, the image display device in a conventional receiver continues, for the most part, to be a vacuum-tube device, namely the kinescope, which, much like the earlier cameras, is bulky and fragile, requires high operating voltages, includes magnetic windings, and requires alignment. The timing of the original television standards is still relevant to the requirements of the kinescope. Some solid-state image display devices are known, but they have not become commercially widespread either because of their high cost or because of various deficiencies such as lag and poor contrast.

As a result of the perceived limitations of the current television standards, attention has been directed to various high-definition television (HDTV) systems, with the hope of supplementing or supplanting the current system with a new television system having enhanced capabilities and performance. Many new systems have been devised and proposed, including a proposed new digital HDTV system for the United States, with 1920 active picture elements (pixels) per line, and with 1080 active horizontal lines per frame. This system, as with other recently proposed systems, includes so may improvements over the current NTSC system, including a wider aspect ratio, that its timing and format are incompatible with NTSC.

New solid-state cameras are being developed to generate signals of a quality commensurate with the new HDTV systems. The number of horizontal scan lines of the image is being increased from the 525 lines required by NTSC, the number of pixels in each horizontal scan line (which corresponds to the number of columns of pixels in the imager) is also increased to provide images with enhanced horizontal resolution, and other deficiencies or problems, such as smear, are being addressed. As the number of light sensor pixels in a camera imager becomes greater, the sensor pixels themselves become smaller (unless the imager size is increased), so the light which each pixel receives is reduced, and the signal-to-noise ratio (SNR) therefore tends to degrade. Increasing the number of scan lines and the number of pixels in the camera imager requires increasing the pixel read rate so that the signals representing a complete image become available at the camera output within the allotted time, and the clock period must therefore be reduced (the clock frequency must be increased), by comparison with an imager for a current standard.

The problem of signal-to-noise ratio of the video signal has been addressed in many ways, one of which is by the use of the "Hole Accumulated Diode" (HAD) structure, which tends to reduce the noise signal, and thereby restore the SNR notwithstanding the smaller sensors. The solution of increasing the read clock rate in order to read the increased number of pixels in the allotted time, however, has not been totally successful, in part because the number of pixels which must be addressed in the imager is so greatly increased.

Early CCD imagers had about 260 pixels per line, and 262 horizontal lines, for a total of about 70,000 pixels, whereas the newer requirements are on the order of 1125 horizontal lines, and 1920 pixels per line, for a total of about 2,200,000 pixels, which is more than twenty times the earlier number. Consequently, clock frequencies which are selected to transfer the charge from all the pixels of the camera imager to the storage region within the allowed time tend to be high enough to be near the limits of the speed at which charge can be transferred within the CCD imager itself. Operation at these transfer clock frequencies, therefore, tends to introduce distortion, which may in part result from incomplete charge transfer during each transfer clock cycle.

The desired number of pixels for HDTV images may be achieved at lower clock rates by using a plurality of CCD imagers with overlapped pixels viewing the same scene, but this imposes additional costs in that two imagers must be used to generate the signal for one color, they must be registered together, and additional control and signal combining circuits must be provided.

SUMMARY OF THE INVENTION

A camera according to the invention includes a CCD imager which generates image-representative signals for a particular television standard, in which predetermined pixel, vertical and horizontal rates, and their associated vertical and horizontal blanking intervals (also known as field or frame blanking intervals and line blanking intervals), are selected to provide particular vertical and horizontal resolution and refresh rates of the reproduced image. The CCD imager includes an image sensing portion with a matrix of light sensor pixels or cells arrayed in rows and columns, for integrating light falling thereon to produce integrated charge signals representative of the image.

The CCD imager also includes an image storage region with a matrix of charge storage cells arrayed in rows and columns corresponding to those of the image sensing portion of the imager. The image storage portion of the imager is coupled to the image sensing portion to receive the integrated charge signals, and to temporarily store the integrated charge signals originating from the image sensor portion.

The camera also includes a vertical charge transfer arrangement coupled to the image sensor portion and to the image storage portion. The vertical charge transfer arrangement receives vertical transfer clock signals, and transfers charge from the image sensing portion of the imager to the image storage portion.

In addition to the vertical charge transfer arrangement, the camera includes a horizontal shift register coupled to the image storage region, which has a number of registers corresponding to the number of pixels in each horizontal line, which registers are loaded in parallel from the charge storage pixels. Once loaded, the charge stored in the horizontal shift register is shifted toward an output reading arrangement or output port in response to horizontal transfer clock signals. The horizontal shift register, together with its ancillary circuits, generates line-scan output video signals in response to the sequence of charge read from its registers.

A clock signal generator associated with the camera is coupled to the vertical transfer clock input port of the vertical charge transfer arrangement and to the horizontal transfer clock input port of the horizontal shift register, for generating the vertical transfer and horizontal transfer clock signals.

In a camera according to the present invention, the clock signal generator generates the horizontal transfer clock signals to transfer horizontal lines of samples in a smaller amount of time than that designated by the television standard. The reduced time for transferring a horizontal line is accumulated over a field or frame interval such that the vertical blanking interval of the image produced by the imager is significantly longer than that designated by the standard. It is during this vertical blanking interval that sample values are shifted from the image sensing portion to the image storage portion of the sensor. Due to the accumulated excess time in the vertical blanking interval, the clock signal generator which generates the vertical transfer clock signal may operate at a lower rate than would be required by the standard, allowing more time for charge transfer and, thus reducing distortion which may be caused by incomplete charge transfer.

According to another aspect of the invention, a standards converter is implemented in the circuitry which processes the output samples provided by the horizontal shift register.

The standards converter comprises a ping-pong or FIFO memory arrangement. The memory arrangement is controlled such that, while data is being written into the memory arrangement with the timing used by the imager, previously stored data is being read out of the memory arrangement with a timing that conforms more closely to the video standard. The read and write timing signals used for this arrangement may have different frequencies and different active and inactive intervals.

DESCRIPTION OF THE DRAWINGS

FIGS. 5a and 5b are simplified block diagrams of exemplary timing converters adapted for use with in the arrangement shown in FIGS. 1a and 1b to convert the signals in a format corresponding to that of FIG. 4b into a format corresponding to that of FIG. 4a.

DESCRIPTION OF THE INVENTION

Figure 1A:
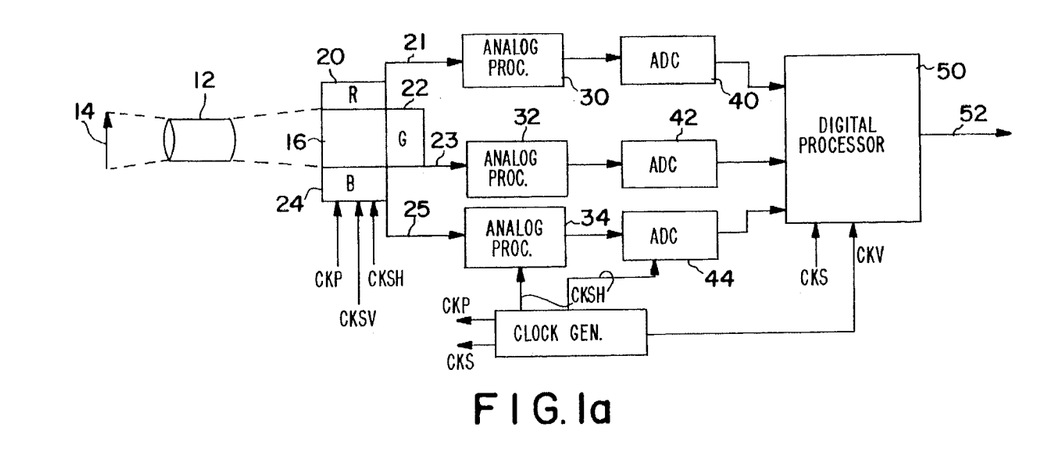
FIG. 1a is a simplified block diagram of a color camera in accordance with the invention, in which three CCD imagers receive red, green and blue light, and generate line-scan signals representative of the image under the control of a clock signal generator.

FIG. 1a is a simplified block diagram of a color camera 10 which includes an objective lens assembly 12 to focus light from an image 14 through a color separation prism 16 and onto the light-sensitive surfaces of red, green and blue CCD imagers 20, 22, and 24, respectively. One of ordinary skill in the art knows that the color designation of the imagers refers to the color of the light, separated by the prism 16, which falls upon them, and that the imagers themselves are ordinarily panchromatic (responsive to all colors).

The red, green and blue CCD imagers 20, 22, and 24 produce line-scan signals at a predetermined field rate under the control of various charge transfer clock signals, CKP, CKSV and CKSH, applied to the imagers from a clock signal generating circuit illustrated as a block 28. The line-scan signals produced by imagers 20, 22, and 24 are applied by way of signal conductors 21, 23, and 25, respectively, to analog preprocessing circuits illustrated as 30, 32, and 34, respectively. Analog preprocessing circuits 30, 32, and 34 may perform amplification and filtering to substantially attenuate frequencies related to the sampling of the CCD imager. In general, the amount of analog preprocessing is kept to a minimum, so that conversion of the signals to digital form can take place as close to the imagers as possible, to take maximum advantage of the stability and control possible with digital processing.

The preprocessed analog signals generated at the output terminals of preprocessing circuits 30, 32, and 34 are applied to analog-to-digital converters (ADCs) 40, 42, and 44, respectively, for conversion into digital form. The ADC's 40, 42 and 44 are also controlled by the clock signal CKSH generated by the clock signal generator 28. The digital signals at the output ports of ADCs 40, 42 and 44 are then applied to digital processing circuitry 50, in which further signal processing, such as black-level, color balance, gamma correction and peaking may be performed, also under the control of the clock signal CKSH generated by clock signal generator 28. The processed R, G and B signals are then converted, by the circuitry 118, into a component format which is re-timed to expand the horizontal blanking intervals and reduce the vertical blanking interval to conform the output signal 52 to the HDTV standard. Although, in the exemplary embodiment, the retiming of the signal is performed by dedicated circuitry, it is contemplated that this operation may be performed by any part of the processing circuitry which uses a memory that is large enough to provide the delays which are used to convert the signal to conform to the standard.

Figure 1B:
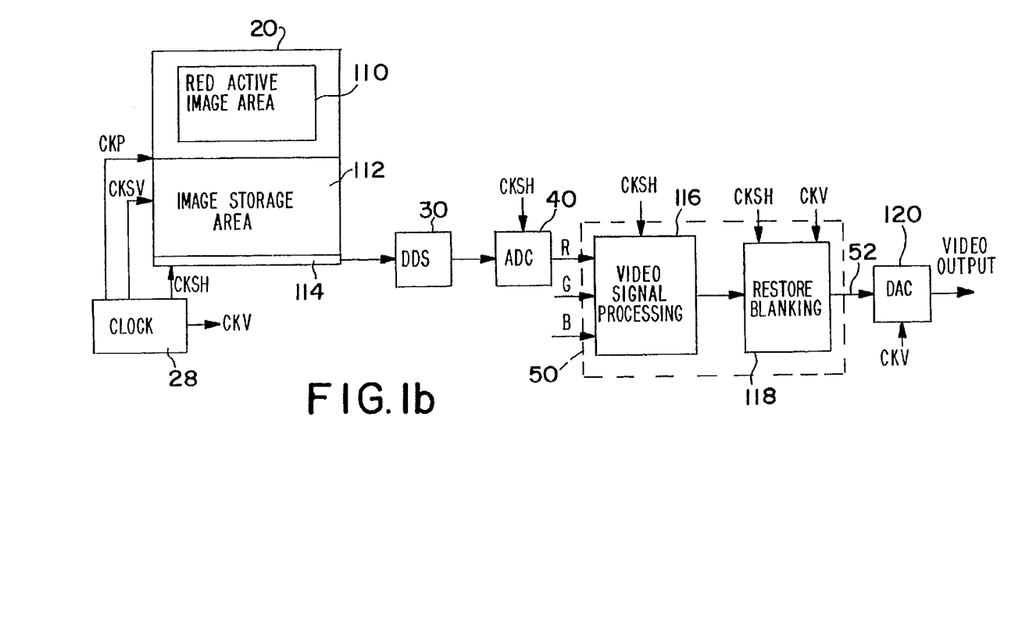
FIG. 1b is a simplified block diagram of a portion of the color camera shown in FIG. 1a which is useful for describing the operation of the subject invention.

FIG. 1b is a simplified block diagram of a portion of the camera shown in FIG. 1a which illustrates details of that system. In FIG. 1b, the red signal imager 20 is shown as having an active image area 110, an image storage area 112 and a horizontal transfer buffer 114. In operation, the image is developed by exposing the active image area to light for a predetermined interval. The image is then shifted from the active area 110 to the image storage area 112 during a time interval corresponding to the vertical blanking interval of the image signal. The image is transferred, one line at a time, from the image storage area to the analog processing circuitry 30, during the time interval in which the next image is being integrated in the active image area. In the circuitry shown in FIG. 1b, the circuitry 30 includes differential and delayed suppression (DDS) circuitry for eliminating sampling artifacts.

As shown in FIG. 1b, the shifting of the image from the active image area to the image storage area is controlled by the clock signal CKP while the shifting of the image lines by the horizontal transfer buffer 114 is controlled by the clock signals CKSV and CKSH. As described in detail below, the signal CKP has a lower rate than would otherwise be required for processing television signals according to the HDTV standard because of the increased vertical blanking time provided by the apparatus according to the present invention. The clock signal generator 28 also produces a signal CKV which represents the timing of the output signal 52 provided by the digital processing circuitry 50. The timing of this signal may be the same as or different from that of the signal CKSH as described below.

In FIG. 1b, the digital processing circuitry 50 is shown as including two sections, a video signal processing section 116 and section 118 which restores the blanking timing to conform the digital signal to the standard. The video signal processing section 116 performs the functions described above with reference to FIG. 1a. The restore blanking section 118 processes the digital signal provided by the section 116 to increase the horizontal blanking time while reducing the vertical blanking time. Circuitry suitable for use as the section 118 is described below with reference to FIGS. 5a and 5b.

Figure 2:
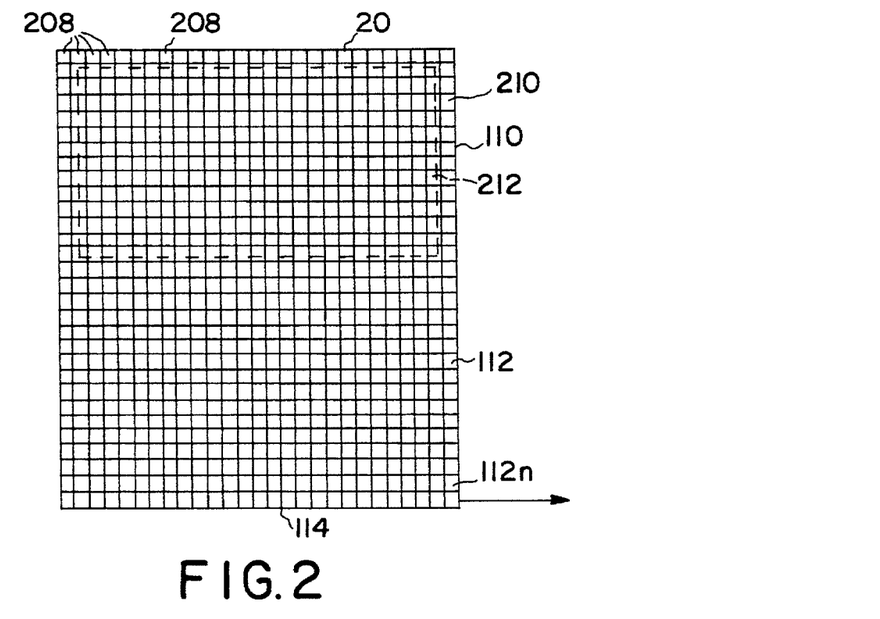
FIG. 2 is a simplified representation of a frame transfer CCD imager which may be used in the arrangement of FIGS. 1a and 1b.

FIG. 2 is a simplified representation of one of the CCD imagers, for example the red imager 20, which may be used in the arrangement of FIG. 1. For the sake of simplicity, the imager is shown as having many fewer cells than would be used by an actual HDTV imager. As illustrated in FIG. 2, imager 20 is a frame transfer imager which has a light-sensitive upper portion or "A" register 110, which includes a plurality of individual CCD cells or sensors 208 arranged in rows and columns. Imager 20 of FIG. 2 also includes a charge storage or "B" register 112, also including a plurality of cells arranged in rows and columns, corresponding to those of the A register 110. The A register 110 includes two portions, an unmasked portion 212 in which the image is captured and a masked portion 210 which covers the fringe areas of the image. In all video imagers, the number of masked cells in the portion 210 is less than the number of samples occurring during the horizontal and vertical blanking intervals. The samples in these fringe areas are used to define the level of the signal provided by the CCD which represents the color black (i.e. CCD black level). Samples representing the horizontal and vertical blanking intervals are provided by periodically stopping the horizontal transfer clock to hold these fringe samples during the blanking intervals.

This periodic stopping and starting of the horizontal transfer clock introduces noise as crosstalk with signals that are processed by the processing circuitry 50. This circuitry converts the charge samples provided by the CCD imager into a video signal. This noise results from the current transients which are caused by gating the clock pulse to each of the cells of the horizontal transfer register 114. While the noise is generated at the start and end of the line in the imager, delays in the image processing system may cause the noise to corrupt the active portion of the signal.

The charge storage cells of B register 112 are sensitive to light, but are masked to prevent light from falling thereon and affecting the charge being stored. Each column of the B register corresponds to a column of the A register, and is a simple continuation thereof.

Imager 20 of FIG. 2 also includes a shift register 114. Shift register 114 is arranged to receive charge simultaneously transferred to its registers from the last row 112n of the image storage region 112, which is adjacent to the horizontal shift register. The simultaneous transfer from the pixels of the last row to the corresponding cells of the shift register 112 occurs during a vertical shift, under the control of the signal CKSV provided by the clock signal generator 28 of FIGS. 1a and 1b. In the exemplary embodiment of the invention, the clock signal CKSV is obtained by dividing the signal CKSH in frequency by the number of cells in the shift register 114. Shift register 114 is also arranged to shift the contents of its shift registers to the right, toward the last cell of the register 114, and from there to the analog processing circuitry 30, which produces the desired analog video output signal for the ADC 40.

In the operation of the frame transfer imager shown in FIG. 2, light from an image falls on the light-sensitive cells or pixels 208 of the A register when a shutter is opened, and charge accumulates in the cells. The amount of charge which accumulates in each cell 208 depends upon the number of photons entering the cell while the shutter is open, which in turn depends upon the intensity of the light falling thereon, and on the length of the exposure time. The exposure time is determined by a shutter which opens to allow charge to accumulate in the A register and closes to allow the charge to be transferred from the A register to the B register during the charge transfer interval.

The charge transfer or "pull-down" interval begins with the application of the clock signal CKP which is normally a polyphase clock signal, to certain metallizations (not illustrated) of the imager. For each complete cycle of the polyphase clock, the charge in each cell 208 of a column is shifted within the same column by one cell toward the B register. Thus, after the first complete cycle of the polyphase charge transfer clock, all of the charge in each column of the register 110 has moved one row closer to the B register 112, and the integrated charge from the bottom row of cells of the A register 210 has entered the top row of charge storage cells of the B register. Successive transfer clock cycles result in further transfers of charge, in a downward direction as illustrated in FIG. 2, toward the storage or B register, and also the transfer of charge downward within the storage or B register. After a particular number of vertical transfer clock cycles (whether single or polyphase), the charge which originated with the uppermost row of the A register 110 arrives at the uppermost row of the B register 112, and the "pull-down" interval. In the "pull-down" interval, the shift register 114 provides sample values representing CCD black level. These samples form a part of the vertical blanking interval of the signal provided by the imager.

During the integrating interval following the charge transfer or "pull-down" interval, charge again accumulates in the A register 110 in response to light falling thereon from the scene being imaged. The integrating interval is also used to read the image signal stored in the B register 112 on a line-by-line basis, by repeatedly (a) transferring the charge stored in the cells of bottom row of the B register to corresponding registers of horizontal transfer register, and (b) reading the horizontal shift register by successively transferring the contents of each register to the right, toward the analog processing circuitry 30. The circuitry 30 produces analog signal voltages at the input terminal of the ADC 40 in response to the succession of charge signals transferred to its input port from the horizontal transfer shift register 114.

Thus, charge stored in horizontal shift register 114 is transferred to the right. When all the charge stored in its registers has been transferred, a new set of charge signals is transferred, in parallel, downward from each row of cells of the B register 112 into the next lower row, and from the lowest row of cells, in parallel, to the corresponding cells of shift register 114. This transfer occurs responsive to the clock signal CKSV. By the time that all of the stored charge has been transferred from B register 220 to the horizontal register 230 and read therefrom, a new set of integrated charge signals becomes available in the A register, and can be transferred to the B register during a pull-down interval to begin the cycle again. In this fashion, line-scan signals are continually produced by the CCD imager.

Figure 3A:
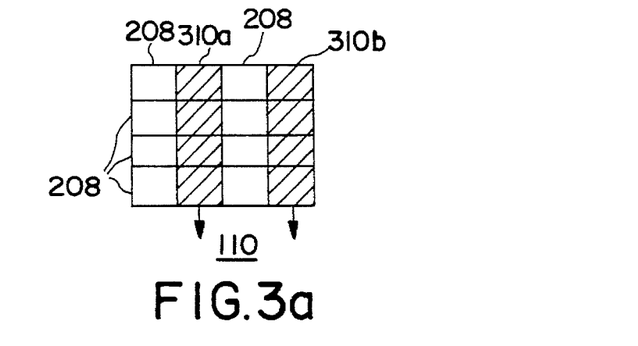
FIGS. 3a and 3b are simplified representation of portions of frame interline transfer (FIT) CCD imagers which may be used in the arrangement of FIGS. 1a and 1b instead of the frame transfer imager of FIG. 2.
Figure 3B:
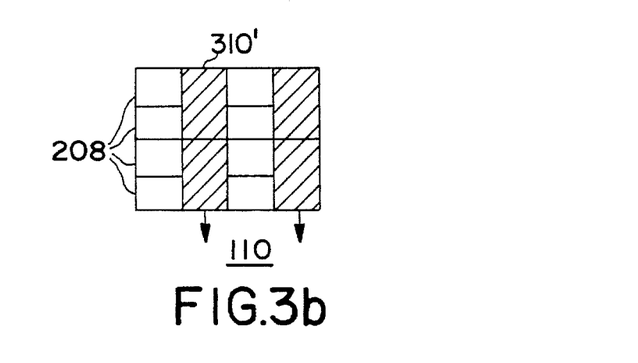

One of the disadvantages of the frame transfer CCD imager as described above is the need for a mechanical shutter. This limits both the time available for charge accumulation and the frame transfer time. If a higher signal to noise ratio is desired then the frame transfer time must be decreased and if a longer frame transfer time is needed then the signal to noise ratio is decreased. The frame interline transfer (FIT) CCD imager arrangement illustrated in FIGS. 3a and 3b achieves the same effect as the frame transfer CCD without using a shutter. FIG. 3a illustrates a portion of the imaging A register of an frame transfer CCD imager which may be used in the arrangement of FIGS. 1a and 1b instead of the frame transfer imager of FIG. 2. In FIGS. 3a and 3b, elements corresponding to those of FIG. 2 are designated by like numerals.

The FIT CCD imager of FIG. 3 includes a light-sensitive A register 210, a B storage register (not shown), and a horizontal shift register (not shown), much like that of FIG. 2. The A register 210 of the arrangement of FIG. 3a differs from that of FIG. 2 in that each vertical column of light-sensitive cells 208 or pixels is paralleled by a vertical charge transfer column 310. Thus, the left column of light-sensitive cells 208 is paralleled by a vertical charge transfer column 310a while the next column of cells is paralleled by a vertical charge transfer column 310b.

The vertical charge transfer columns 310 are masked so as not to be light-sensitive. As known to those skilled in the art, charge transfer during the pull-down interval occurs when, during a first clock pulse(s) of the charge transfer period, charge is transferred from each photosensitive cell 208 of the A register 110 into a corresponding cell of the adjacent vertical charge transfer column 310. The charge so transferred is then pulled down through the masked vertical charge transfer columns 310, rather than through the light-sensitive cells 208, and is then stored in the B register, much as described in relation to the imager of FIG. 2. Thus, the FIT CCD imager is similar to that of FIG. 2, with the exception that the vertical transfer is performed through a vertical charge transfer column which is not sensitive to light. Thus, the charge transfer may take place while the imager is illuminated.

Both the frame transfer imager and the FIT imager may be operated in a frame mode in which an entire frame of video information is transferred from the A register to the B register. A field of video information may be derived from the stored frame by selectively combining pixels. If successive lines of the stored image are numbered 1, 2, 3, 4, 5, an even field may be obtained by combining line 1 with line 2, and line 3 with line 4. An interleaved odd field may be obtained by combining line 2 with line 3 and line 4 with line 5 after the next vertical transfer. In the FIT imager, the combining of the pixel values may be done before the image is transferred to the B register. In imagers of this type, the B register may be reduced to hold only one field of data.

As illustrated in FIG. 3a, the B register 220 has one cell 208 of the charge storage column associated with each cell of the vertical charge transfer column 310. A variant of the FIT imager, the M-FIT imager, allows multiple transfers from the image area to the storage area during the pull-down interval, so that even and odd pixels may be processed separately for interlaced scanning. An exemplary M-FIT imager is shown in FIG. 3b. In this FIGURE, each pair of light sensitive cells 208 is coupled to a single cell of the vertical charge transfer column 310'. The top cell of each pair may correspond to a pixel from the "odd" field of an image while the bottom cell corresponds to a pixel of the "even" field of the image. While the cells of the even field are integrating charge, the cells of the odd field may transfer their data to the vertical charge transfer columns 310' and while the cells of the odd field are integrating charge, the cells of the even field may transfer their data to the vertical charge transfer columns.

The M-FIT imager is generally operated to transfer two fields of video information from the A register to the B register during a single vertical interval. One field is stored in the lower portion of the B register and the other field is stored in the upper portion of the B register. The image data produced by this imager may be used as a single frame in a progressive scan display system or one of the fields may be selected after each vertical transfer interval in an interlace scan display system.

It is contemplated, however, that the M-FIT imager may be operated in a field mode in which a single field of charge signals is transferred during each field blanking interval. In an imager of this type, the B register may have a number of cells sufficient to hold only a field of charge samples.

A disadvantage of all types of CCD imagers which operate at high speed is a smear in the image caused by incomplete charge transfer. Due to the shortened length of the transfer interval, caused by the high-frequency clock signal, significant amounts of charge may remain in a cell at the end of the transfer interval. This incomplete charge transfer causes a low-pass filtering effect in the image recovered from the imager, which increases with the distance of the integrating cell from the output shift register.

Figure 4A:
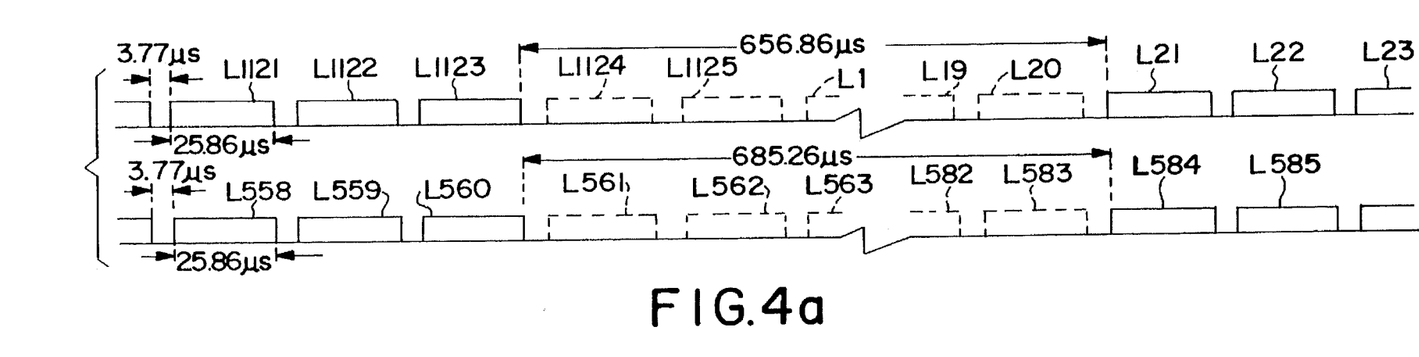
FIG. 4a is a timing diagram representing the timing of the proposed U.S. HDTV production standard.

FIG. 4a represents the timing associated with a conventional television standard, in this particular instance the proposed U.S. HDTV production standard, 1125 horizontal lines, of which 1080 are active, in each 1/30 second frame (0.0333 second duration), divided into two 1/60 second fields. As described above, each of the frame imager, the FIT imager and the M-FIT imager may be operated in either a frame mode or a field mode. In the description below, field operation is assumed and, where appropriate, references are made to modifications for frame operation. The illustrated portion of the two timing diagrams are in the regions near the end of one field and the beginning of the next.

In the upper timing diagram of FIG. 4a, the last few of the 540 active horizontal line intervals of the previous (e.g. odd) color field are illustrated, namely horizontal line intervals 1121, 1122 and 1123, each with a total duration of about 29.63 microseconds ($\mu$S), and with a horizontal blanking duration of about 3.77 $\mu$S, giving an active horizontal interval of about 25.86 $\mu$S. The active horizontal intervals 1121, 1122, 1123, 21, 22, and 23 correspond to the times at which useful video information is produced on output signal path 52 of FIG. 1a. The lower timing diagram of FIG. 4a illustrates the end of the even field and the beginning of the next odd field. The time intervals between line 1123 and line 21 and between lines 560 and 584 correspond to the vertical blanking intervals. The output video signal during this time interval is ignored since it will be supplied when the vertical synchronization signals are inserted.

With the abovedescribed durations, the total time available for the two vertical blanking intervals of the frame is the 0.0333 seconds (33,333 $\mu$S) per frame interval, minus the product of 1080 active lines per frame multiplied by the 29.63 $\mu$S duration of each line (32,000 $\mu$S), which corresponds to 33,333 $\mu$S–32,000 $\mu$S, which equals 1333 $\mu$S available for vertical blanking. The imagers shown in FIGS. 2, 3a and 3b transfer an entire frame of video information at one time. Operating in a field mode, however, this entire frame is transferred in one of the two field vertical blanking period. Thus, the vertical transfer interval for these imagers is approximately 657 $\mu$S for the 22 line blanking period of an odd field to even field transition and 685 $\mu$S for the 23 line blanking period of an even field to odd field transition. A frame-based system having a frame rate of 60 frames/second, would have the same vertical transfer interval. If the frame rate were reduced the 30 frames/second, the vertical transfer interval would be 1342 $\mu$s.

According to an aspect of the invention, clock signal generator 28 of FIG. 1 generates control signals for the imager of FIG. 2, FIG. 3a or FIG. 3b with a timing that differs from that of the conventional television system with which the video signals are used, in this case the proposed U.S. HDTV production standard. Accordingly, clock signal generator 28 of FIG. 1 generates clock signals for its CCD imagers as illustrated in FIG. 4b when the resulting video signals are to be used with the proposed U.S. HDTV system.

Figure 4B:
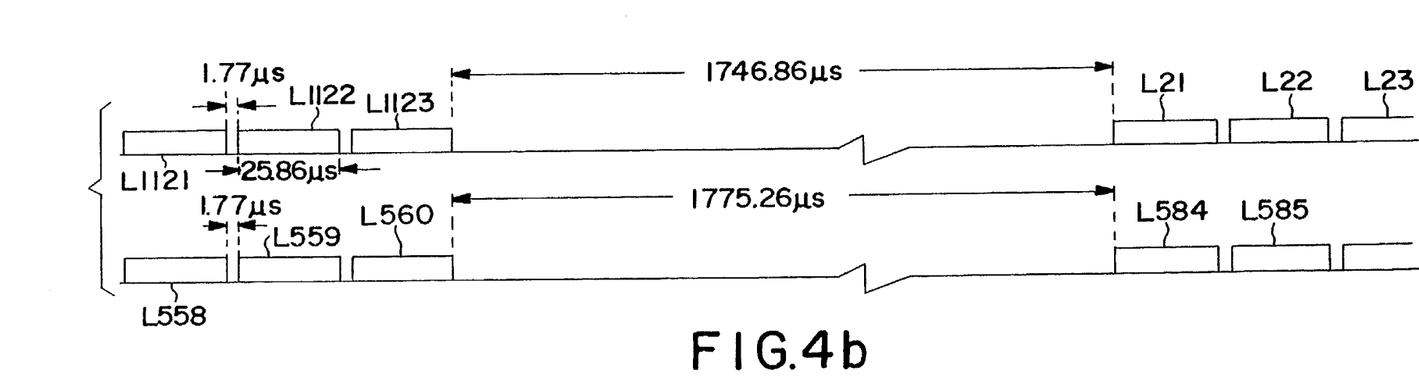
FIG. 4b is a timing diagram representing the timing of signals according to the invention, controlled by the clock signal generator of FIGS. 1a and 1b.

FIG. 4b, shows the timing of the output signal of an imager such as that shown in FIGS. 2, 3a or 3b in accordance with the present invention. The last few and first few of the 1080 active horizontal line intervals of each color field are illustrated. In the upper timing diagram, these are line intervals 1121, 1122, and 1123, and line intervals 21, 22 and 23. In the lower timing diagram, these are line intervals 559 and 560 and line intervals 584 and 585. In these timing diagrams, the horizontal blanking duration has been reduced to 1.77 $\mu$S, reducing the total horizontal line duration of 27.6 $\mu$S. The frame interval of 33,333 $\mu$S, however, is the same as in FIG. 4a.

Since the duration of each of the 1080 active horizontal lines has been reduced by 2 $\mu$S by comparison with the duration of the proposed HDTV standard described in conjunction with FIG. 4a, the duration of the 1080 active lines of the 1/30 second frame is reduced by 2160 $\mu$S, and the total vertical blanking interval is therefore increased from its former total value of 1342 MS (about 1.3 milliseconds or msec) to 3522 $\mu$S. This translates to vertical field blanking intervals of approximately 1747 $\mu$S and 1775 $\mu$S. The minimum duration of the vertical blanking interval available for transfer of signal from the A register to the B register is thus increased from 657 $\mu$S to 1747 $\mu$S that is to say by a factor greater than two.

The reduction in the horizontal blanking interval does not adversely affect the operation of the CCD imager, because imagers of this type do not rely on inductors to operate, as does a conventional vacuum tube imager, thus, there is no minimum retrace time for a CCD imager. As discussed above, however, the relatively short duration of the vertical blanking interval in prior-art CCD imagers for such applications may require such a high vertical transfer clock rate resulting in distortion of the signals transferred from the A register to the B register. A vertical blanking (VB) interval having a representative duration of 1.747 msec is illustrated in FIG. 4b, and the same number of vertical charge transfer steps are required as when the timing is as described in conjunction with FIG. 4a, but the time available is increased by about 2½ times, so the frequency of the transfer clock CKP may be decreased by a like factor, to about 40% of the previous clock rate. In principle, there is no reason that the 1.8 $\mu$S remaining horizontal blanking interval of FIG. 4b cannot be reduced almost to zero, which could more than quadruple the time available for vertical transfer as compared to a conventional CCD imager. It should be noted that the active portion of each horizontal line in FIG. 4b has the same duration, 25.86 $\mu$S, as the active portion of each horizontal line in FIG. 4a.

Those skilled in the art know how to generate timing signals for control of a CCD imager. U.S. Pat. No. 4,521,804, issued Jun. 4, 1985 in the name of Bendell, which is hereby incorporated by reference for its teachings on CCD video cameras, for example, describes generally how to operate a CCD imager with timing signals which are relatively adjusted to compensate for misregistration between the R, G, and B imagers. Thus, no detailed description of timing generator 28 of FIG. 1 is believed to be necessary to enable one of average skill in the art to generate timing and control signals appropriate for driving a CCD imager in accordance with the invention.

According to a further aspect of the invention, the noise introduced into image processing system gating the horizontal clock signals on and off is reduced by continuously applying the clock signal to the horizontal shift register. As described above, this noise may propagate through the processing circuitry and corrupt active portions of the video signal. The horizontal clock signals thus cause a continuously clocked shifting of the horizontal shift register, regardless of whether or not its registers contain charge signals representing active pixels. Thus, the shift register 230 shifts to its output signal line (by way of an output signal processor 240) all the signal which it contains, and when all the signal is transferred, it continues to transfer signals representing shift registers which are empty of charge, corresponding to a blanking interval signal.

Figure 5A:
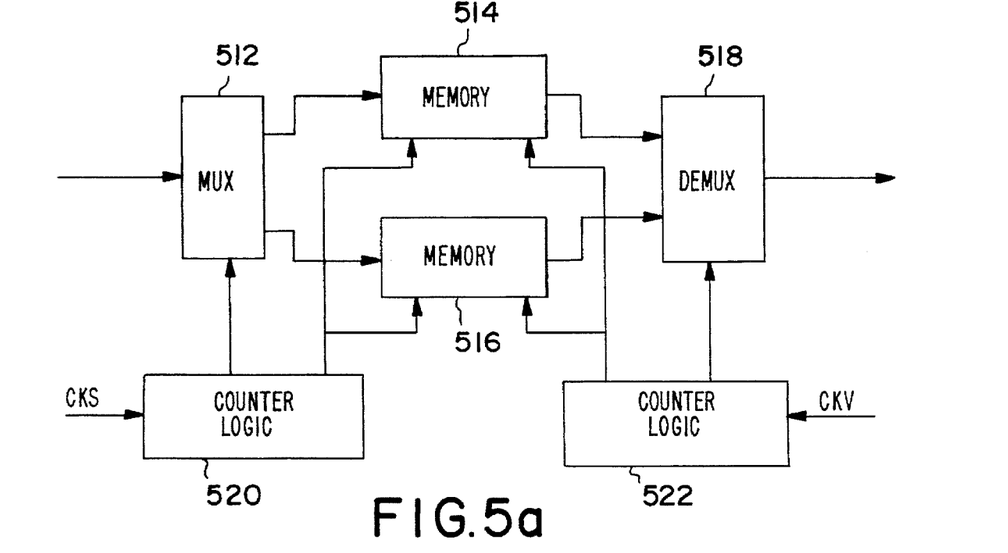
Figure 5B:
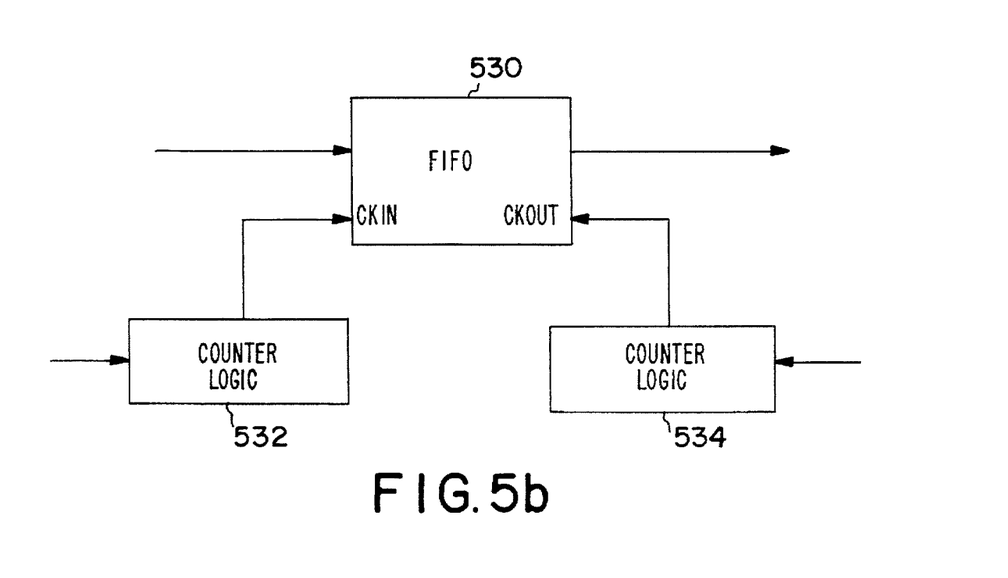

As so far described, the video signals produced by the imager of FIGS. 2, 3a or 3b, under the timing control described in conjunction with FIG. 4b, does not match the requirements of the proposed U.S. HDTV standard, as described in conjunction with FIG. 4a, although it is highly advantageous for reducing distortion in the CCD imager. FIGS. 5a and 5b are simplified block diagrams of blanking restoration circuitry which may be coupled to output signal path 21 of the imager, and to clock signal generator 28 of FIG. 1. This circuitry is used to convert the timing of the signals leaving the CCD imager of FIGS. 2 or 3, generated as described in accordance with FIG. 4b, into signals which correspond to the timing of the proposed U.S. HDTV production standard, described in conjunction with FIG. 4a.

As shown in FIG. 5a, the circuitry includes memories 514 and 516, a multiplexer 512, a demultiplexer 518 and counter logic circuits 520 and 522. Information or signals produced by the imager are applied from the video signal processing section 116 (shown in FIG. 1b) to the input port of the multiplexer 512 as they are produced, until such time as they are read from the memory arrangement in accordance with the new timing standards.

Multiplexer 512 of FIG. 5a is coupled to counter logic 520, which is responsive to the clock signal CKSH to switch the multiplexer 512 between coupling its input signal to the memory 514 and the memory 516. The counter logic 520 may, for example, count a number of samples occurring in a field or frame of the video signal as being applied to one of the memories, and then reset its internal counter (not shown). In addition, the counter logic 520 may cause the multiplexer to switch its output signal to the other one of the memories. Demultiplexer 518 of FIG. 5a is coupled to a counter logic circuit 522 which receives the clock signal CKV from the clock generator 28 shown in FIG. 1. The counter logic 522 may, for example, count the number of active samples on each line from the one of the memories 514 and 516, which is not being written into by the multiplexer 512, and then hold the samples corresponding to the horizontal blanking interval, to extend the horizontal blanking interval from 1.77 µS to 3.77 µS. Extra samples which may have been inserted in the vertical blanking interval are ignored when the internal counter in the logic circuitry 522 is reset at the end of a frame or field interval, depending upon whether an imager such as that shown in FIGS. 2 and 3a or that shown in FIG. 2b is being used.

The video signal produced by the imager which represents the first active line interval of a field (line 21 of FIG. 4b) is coupled by switch 512 of FIG. 5a to memory 524, and is written into memory 514. As described above, the field of information is read out, one field interval later, when the next image frame is being stored into the memory 516. Therefore, some absolute delay is included within the memory arrangement, in known fashion, to eliminate the need to simultaneously read and write to one of the memories 514 and 516. Note that the durations of the active intervals of the imager output signal (FIG. 4b) equal that of the standard with which it is used (FIG. 4a), and total amount of time needed to write an image frame to, or to read an image field from one of the memories 514 and 516 is the same.

The same analysis holds for an imager operated in a frame mode. The only differences would be that the memories 514 and 516 would be frame memories instead of field memories.

An alternative circuit for restoring horizontal and vertical blanking is shown in FIG. 5b. In this circuit, a single first-in-first-out (FIFO) memory is used in place of the two ping-pong memories 514 and 516 and the multiplexer 512 and demultiplexer 518, shown in FIG. 5a. The operation of a FIFO memory is well known and, so, is not described in detail. Basically, data is written into the memory responsive to an input clock signal (CKIN) and is read out of the memory responsive to a output clock signal (CKOUT). When no clock signal is applied, the data previously provided by the memory is held at the output port.

In this alternative embodiment, data from the video signal processing section is written into the memory 530 as it is received and is read out of the memory with some samples being held to lengthen the horizontal blanking intervals. One advantage of a system of this type is reduced memory usage. Instead of one or two fields of memory, as was used by the system shown in FIG. 5a, the FIFO memory 530 may use only a number of cells needed to hold one line of samples plus the number of cells needed to hold a number of samples which occur in 2180 µS, representing the difference between the 3522 µS vertical blanking interval of the input signal and the 1342 µS vertical blanking interval of the output signal. This alternative embodiment may have an even smaller memory usage when a field-based imager is used, since the difference in the vertical field blanking intervals is reduced to 1090 µS.

Although, in the exemplary embodiments of the invention, the timing of each horizontal line is shortened in the imager by selectively deleting samples in the horizontal blanking interval, it is contemplated that other methods may be used to shorten this interval the horizontal line interval. For example, the frequency of the horizontal transfer clock signal, CKSH, may be increased, causing the active samples in each horizontal line to be provided in a reduced time interval. As with the exemplary embodiment, the difference between the horizontal line interval dictated by the video standard and this reduced time interval may be accumulated over a vertical field or frame interval to provide a longer time interval for transferring the charge samples from the imaging area to the frame or field storage area. This alternative embodiment may be implemented using the circuitry shown in FIG. 1 by simply changing the frequency of the clock signals CKSH and CKSV. In this further embodiment, the circuitry 118 would reduce the sample frequency of each line to restore the line interval and the field or frame interval to the values specified under the appropriate standard.

Other embodiments of the invention will be apparent to those skilled in the art. While a particular standard has been described, the principles of the invention may be applied to any television system using CCD imagers or to imagers having equivalent problems. While details of the video signal processing have not been described in detail, the processing may include any conventional processing appropriate to the situation. The invention may be particularly advantageous for camcorders, in which a single timing source, equivalent to clock signal generator 28 of FIG. 1, is used for controlling both the imager and the user apparatus (the video recorder).

The invention claimed is:

1. A video camera system which produces a video signal having successive frames, each frame having a plurality of successive lines of samples, wherein each line of samples includes a line blanking time interval which separates the line of samples from a next successive line of samples and each frame includes a frame blanking time interval which separates the frame from a next successive frame, each line includes a number of samples determined by a video standard, the video camera system comprising:

an imager including:
   an image sensing portion having a matrix of light sensitive cells which integrate light falling thereon to produce integrated charge samples representative of the image;
   an image storage portion having a matrix charge storage cells corresponding to the cells of the image sensing portion;

frame charge transfer means coupled to the image sensor portion and to the image storage portion of the imager for transferring the integrated charge samples from the image sensing portion to the image storage portion of the imager during the frame blanking time interval at a rate determined by a frame transfer clock signal;

line charge transfer means for transferring lines of samples from the image storage portion of the imager at a rate determined by a line transfer clock signal;

clock signal generator means for generating the frame transfer and line transfer clock signals, wherein the line transfer clock signal causes the line charge transfer means to transfer each line of samples in a smaller time interval than is provided by the video standard to effectively increase the frame blanking time interval to be greater than provided by the standard and the frame transfer clock signal causes the frame charge transfer means to transfer the integrated charge samples over the increased frame blanking time interval; and signal retiming means coupled to the line charge transfer means, the signal retiming means for conforming the lines of samples, received from the line charge transfer means, to the video standard.

2. A video camera system according to claim 1, wherein:
the clock signal generator means reduces the time interval for transferring the samples in each line by deleting a portion of the samples in each line which occur in the line blanking time interval to effectively reduce the line blanking time interval; and the signal retiming means includes means for repeating samples which occur in the reduced line blanking time interval of each line to conform the line blanking time interval and the frame blanking time interval to the video standard.

3. A video camera system according to claim 2, wherein the signal restoration means comprises:

a ping-pong memory arrangement having first and second memories which are configured to alternately receive and provide samples representing successive frames; and control means for holding the samples provided by the ping-pong memory arrangement which represent the line blanking interval of each line to effectively increase the line blanking intervals.

4. A video camera system according to claim 1, wherein:
the clock signal generator means reduces the time interval for transferring the samples in each line by increasing the frequency of the line transfer clock signal to effectively reduce the horizontal line interval; and the signal retiming means includes means for storing the samples at a rate determined by the line transfer clock signal and for fetching the stored samples at a rate determined by a clock signal which conforms to the sample rate specified by the video standard.

5. A video camera system which produces a video signal having successive frames, each frame having a plurality of successive lines of samples, wherein each line of samples includes samples representing a blanking level which separate the line of samples from a next successive line of samples, wherein each line includes a number of samples defined by a video standard, the video camera system comprising:

an imager including:
   an image sensing portion having rows and columns of light sensitive cells, arranged in a matrix, which integrate light falling thereon to produce integrated charge samples representative of the image, wherein the rows of samples correspond to the lines of samples of the video signal and each row includes a number of cells which is less than the number of samples per line defined by the video standard;
   an image storage portion having a matrix of charge storage cells corresponding to the cells of the image sensing portion;

frame charge transfer means coupled to the image sensor portion and to the image storage portion of the imager for transferring the integrated charge samples from the image sensing portion to the image storage portion of the imager at a rate determined by a frame transfer clock signal during a frame blanking time interval;

line charge transfer means for transferring lines of samples from the image storage portion of the imager at a rate determined by a line transfer clock signal;

clock signal generator means for generating the frame transfer and line transfer clock signals, wherein the line transfer clock signal runs continuously, causing the line charge transfer means to transfer a smaller number of samples in each line than is provided by the video standard to effectively increase the frame blanking time interval to be greater than defined by the standard, and the frame transfer clock signal causes the vertical charge transfer means to transfer the integrated charge samples over the increased vertical blanking time interval; and signal retiming means coupled to the line charge transfer means, the signal retiming means for receiving the lines of samples provided by the line charge transfer means and for providing samples representing the blanking level to increase the number of samples in each line to correspond to the video standard, thereby decreasing the frame blanking time intervals to match the standard.

6. A video camera system according to claim 5, wherein the signal restoration means includes means for repeating samples in each line which represent the blanking level to conform the number of samples in each line and the frame blanking time interval to the video standard.

7. A video camera system according to claim 6, wherein the signal restoration means comprises:

a ping-pong memory arrangement having first and second memories which are configured to alternately receive and provide samples representing successive frames; and control means for holding the samples provided by the ping-pong memory arrangement which represent the blanking level in each line to effectively increase the number of such samples in each line.

* * * * *